Feb. 5, 1929.
F. HOWE
1,701,074
AUTOMOBILE BUMPER
Filed Nov. 10, 1925  2 Sheets-Sheet 1
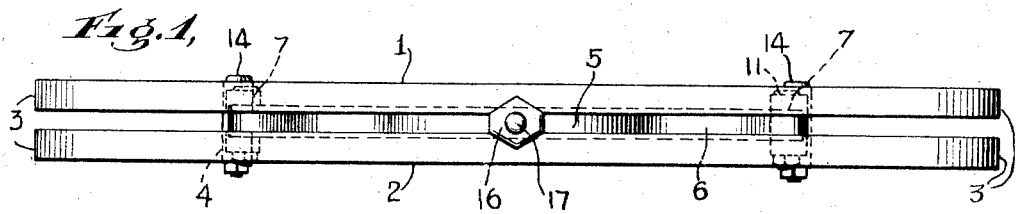
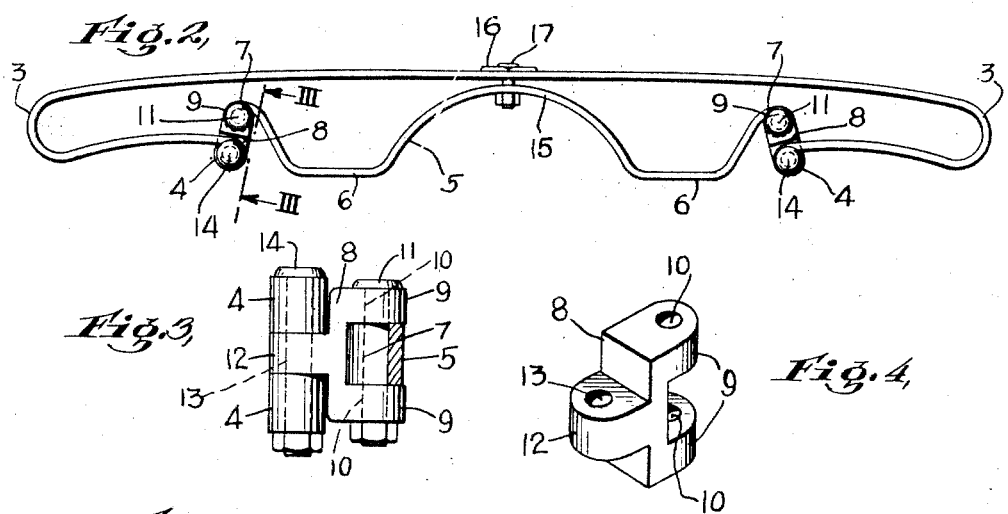
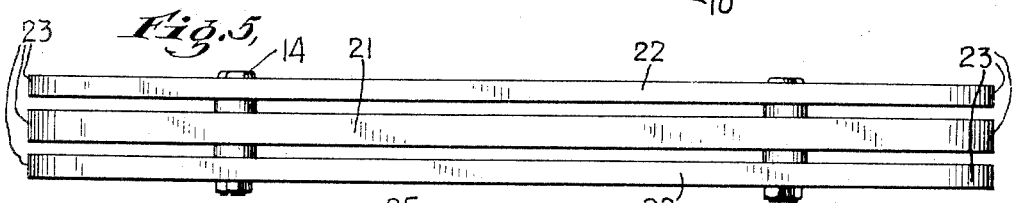
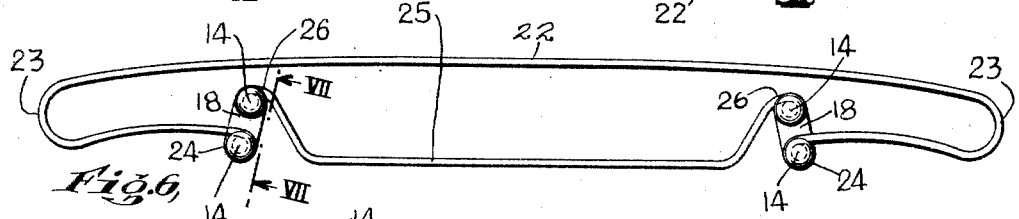
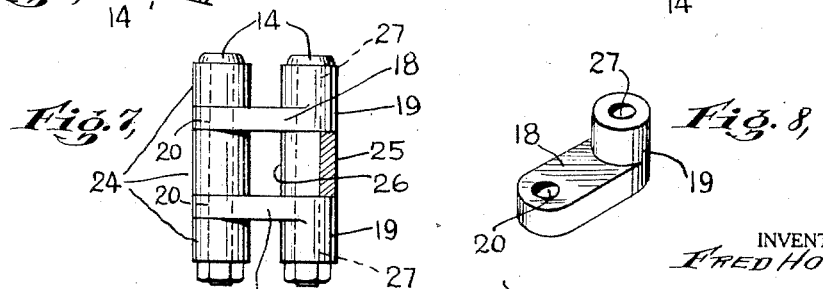
INVENTOR
FRED HOWE
BY
Frederick S. Duncan
ATTORNEY

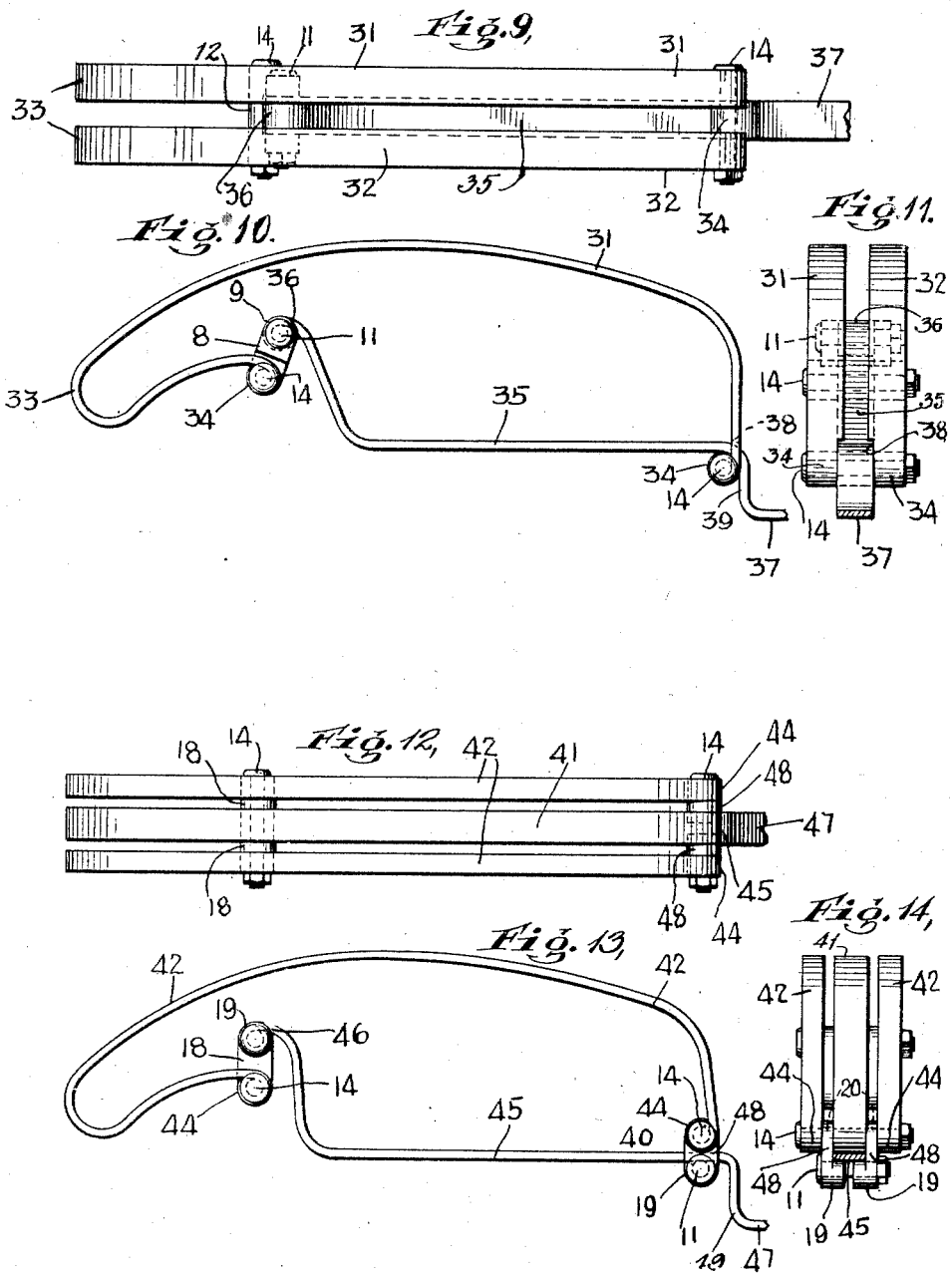

Patented Feb. 5, 1929.

1,701,074

UNITED STATES PATENT OFFICE.

FRED HOWE, OF ADRIAN, MICHIGAN, ASSIGNOR TO PAGE STEEL & WIRE COMPANY, A CORPORATION OF NEW JERSEY.

AUTOMOBILE BUMPER.

Application filed November 10, 1925. Serial No. 68,068.

This invention relates to automobile bumpers and has for its object the provision of a bumper comprising elements of such a character that they may be assembled readily to form a multi-bar bumper of simple and inexpensive structure having two or more impact receiving members connected by shackles with a rear bar, the impact receiving members preferably being bent upon themselves to form end loops terminating in eyes spaced apart from each other and spaced at a suitable distance from the impact members, while the rear bar is preferably formed with an attaching portion spaced from the rear surface of the impact members and terminating in eyes adapted to be connected to the aforesaid shackles whereby the terminal eyes of the impact members are hinged to the terminal eyes of the rear bar. A portion of the rear bar intermediate the attaching portions may be bent forward and connected with the impact members at or near the center of the bumper.

Another object of the invention is to provide a bumper having the above described structural elements and which may be readily constituted as a two bar bumper or a three bar bumper, etc., with but little substitution or interchange of parts.

Such bumpers are characterized by the desirable advantage that the impact bars are similar in both the two bar and three bar types, so that the only different parts required are the connecting shackles and clamps. The bulk of the parts may be manufactured with large tolerance and still be capable of ready assembly.

A further object of the invention is to provide shackles or connecting members of strong, compact and inexpensive structure, standardized in form, and of a character so universal in their capability of use that they may be utilized also in the construction of bumper devices of the type known as fender guards, with desirable advantages of manufacture, particularly in the construction of fender guards having two or more bars. A provision of notable importance in the construction of these improved shackles is their formation to act as devices to space the bars in superimposed alignment without the need for other spacing means, and to permit the connection of the bars to be effected by the use of ordinary bolts and with such tools as are usually available readily for users of automobiles.

Still another object is to provide shackles which form with the associated bumper eyes a hinged structure of unusual strength and symmetry, adding desirably to the attractive appearance of the bumper structure, which constitutes a prominent and important feature of the general automobile structure.

In the drawings,

Fig. 1 is a view in front elevation of a bumper in the construction of which the invention has been embodied.

Fig. 2 is a plan view of the same.

Fig. 3 is a vertical section on the line III—III of Fig. 2.

Fig. 4 is a detail view in perspective of one of the shackle or connecting members, isolated.

Fig. 5 is a view similar to Fig. 1 showing a three bar bumper composed of elements like those in Fig. 1.

Fig. 6 is a plan view of the bumper shown in Fig. 4.

Fig. 7 is a vertical section on the line VII—VII of Fig. 6.

Fig. 8 is a detail view in perspective of one of the shackle members used in the bumper shown in Fig. 6.

Fig. 9 is a view in front elevation of a bumper device of the type known as a fender guard in the construction of which the invention has been embodied.

Fig. 10 is a plan view of the same.

Fig. 11 is a view in side elevation, looking from right to left of Fig. 10.

Fig. 12 is a view in front elevation of a similar fender guard having three impact bars.

Fig. 13 is a plan view of the same.

Fig. 14 is a view in side elevation, partly in section, looking from right to left of Fig. 13.

In the illustrated embodiment, referring to the structure shown in Figs. 1 to 4, the reference characters 1 and 2 designate impact members each comprising a flat strip of resilient steel having its ends bent upon themselves to form loops 3 terminating in eyes 4 respectively spaced rearward at approximately the distance shown, these terminal eyes being situated respectively near the regions for attachment of the structure to the automobile, as for example at the frame horns (not shown) at the front or rear of an automobile.

In accordance with the invention, a rear bar 5 is provided, which is preferably formed of a similar strip of flat steel, adapted to be attached to the automobile structure, as by the portions 6, and at such attaching regions the rear bar is preferably spaced at about the distance illustrated from the rear surface of the impact bars. The rear bar terminates in eyes 7 which preferably are situated somewhat nearer to the rear surface of the front bars, adjacent to the eyes 4 of the impact members.

The eyes of the rear bar are shown as connected with the eyes of the impact members by means of shackles or links which may desirably take the form of stirrups having body portions 8 provided with offset portions 9 spaced suitably to embrace the eyes 7 of the rear bar, with apertures 10 adapted to receive bolts 11 passing through the eyes 7 and thus secured to the rear bar, while a portion 12 of the shackle, offset in the opposite direction, is adapted to be interposed between the eyes 4 of the impact members 1 and 2, serving to space them apart vertically, and having an aperture 13 through which passes a bolt 14 which also transfixes the eyes 4 of the impact members.

By such connecting means, it will be readily seen that the impact bars can be hinged to the rear bar readily with considerable tolerance for differences in the bending operations of the individual bars, and also that but few parts are required to complete the working structure.

In Fig. 2 the rear bar is shown with a central arch 15 extending forward to a central point near the center of the impact members, and the arched portion 15 may desirably be connected to the impact members by suitable means, herein shown as taking the form of a front plate 16, from which a bolt 17 extends rearward between the front bars, and through the arch 15, aiding to retain the impact members and rear bar in assembled relation.

In Figs. 5 and 6, I have shown a bumper constituted of a middle impact member 21 and upper and lower impact members 22, preferably superimposed in the same vertical plane, and having respectively loop ends 23 with terminal eyes 24, the above described members being preferably identical in material and contour with the members 1 and 2 heretofore described.

Similarly the rear bar 25 is formed with terminal eyes 26 disposed in substantially the same relative position as the eyes 7 of the rear bar 5 heretofore described, and in fact the bar 5 and the bar 25 may be exchanged, the only difference in shape therebetween being that the middle portion of the rear bar 25 is shown as straight, instead of having an arched portion 15 connected with the middle of the impact bars.

In pursuance of the invention, the impact members 21 and 22 are hinged to the rear bar 25 by shackles 18 apertured at 20 to receive bolts 14 passing through the eyes 24 of the impact members, while an offset portion 19 of each shackle is provided with an aperture 27 through which passes a similar bolt 14 transfixing the eye 26 of the rear bar. Two of these shackles are shown at each hinged connection between the impact bars and rear bar, and these four shackle members may be of identical structure, so that they are capable of use interchangeably with each other.

These shackles correspond with the shackle 8 already described in having an apertured portion 20 offset from the body portion 18 to enter between the eyes 24 of two of the impact members, serving to space them in vertically superimposed relation, and they also correspond with the aforesaid shackles in having the portion 19 offset in the other direction and apertured to receive the bolt 14 passing through the eye 26 of the rear bar.

The shackles 18 are however specially adapted for use in making up bumpers having more than two impact bars, by the provision of an offset portion 19 which does not embrace the rear-bar eye but is engaged with one side only of the eye, in the case of each shackle so employed, while an exactly similar shackle serves in reversed position on the other side of the eye 26, the bosses 19 affording, with the eye 26, a very broad bearing for the bolt transfixing the rear-bar eye, and lending an attractive uniformity of design to the hinge as a whole in that the cylindrical appearance of the bosses 19 extending up and down from their body portions 18 conforms to the cylindrical appearance of the eyes 24 on the impact members 21 and 22, extending up and down from the opposite ends of the body portions 18 when viewed in the direction of Fig. 7.

In the embodiment illustrated in Figs. 9 to 14 inclusive, I have illustrated the invention as applied to automobile bumpers of the type known as fender guards, of which Figs. 9 to 10 show such a fender guard having two impact members or bars respectively numbered 31 and 32 having respectively loop ends 33 with terminal eyes 34 at one end of each, while the other ends have similar terminal eyes 34. The rear bar 35 is shown having a terminal eye 36 and an attaching portion 37, this portion preferably being extended to serve for the attachment of a symmetrically formed fender guard adapted to protect the fender upon the other side of the automobile to which the same may be attached.

At 8 is shown a shackle having offset portions 9 spaced suitably to embrace the eye 36 of the rear bar, and with apertures 10 to receive a bolt 11 passing through the apertures 10 and eye 36, being thus connected pivotally with the rear bar, while a portion 12 of the shackle is offset medially in the other direction and adapted to be interposed between the eyes 34 of the impact members 31 and 32, serving to space them apart in vertical relation, and having an aperture 13 through which passes a bolt 14 which also transfixes the eyes 34 of the impact members, connecting the shackle thereto pivotally.

Where the rear bar 35 is of approximately the same breadth as that of the members 31 and 32, the latter may be cut away as indicated at 38 to fit the rear bar, and in that event the rear bar is desirably formed with a reverse bend as indicated at 39, this portion serving as an abutment to prevent lateral spreading of the members 31 and 32, while a bolt 14, passing through the eyes 34 in the adjacent ends of the members 31 and 32, serves likewise to prevent spreading thereof outwardly, and also holds the bars in assembled relation.

In Figs. 12 to 14 is illustrated a three-bar fender-guard having a main impact bar 41 and two auxiliary impact bars 42 superimposed in vertical relation, deriving their support from a rear bar 45 to which they are hinged by shackles which correspond in structure to the shackle 18 shown and described with reference to Fig. 8, having each an apertured portion 20 offset from the body portion 18 to enter between eyes 44 on the outer ends respectively of the main bar 41 and one of the auxiliary bars 42, being connected pivotally by a bolt 14, while the opposite end of each shackle is provided with an offset portion 19 having a boss apertured to receive a pivot bolt 14 transfixing an eye at the outer end of the rear bar 45, so that the assembled hinge is identical in arrangement and operation with that shown and described with reference to Fig. 7.

In the instance illustrated in Figs. 12 to 14, a similar pair of shackles or clamps is shown at 48 to secure the inner end eyes 44 of the impact bars 41 and 42 to the rear bar 45, each of these shackles or clamping members 48 having an apertured offset portion 20 transfixed by a bolt 14 which passes through the eyes 44, and each shackle member or clamp having an oppositely offset apertured portion 19 formed with a boss transfixed by a bolt 11, the bosses being arranged, as indicated, to embrace and hold the rear bar 45, thus serving to prevent displacement of the fender guard either forward or rearward relatively to the rear bar. The rear bar is desirably formed with a portion 47 to extend across the rear end of the automobile, at the other side of which is preferably provided a part similar to that shown at 45 and having a terminal eye co-operating with a set of impact members which may be symmetrical in every respect with the impact bars 41 and 42 above described, and connected therewith by shackles and bolts like those at 18, 48, 11 and 14, so that these symmetrical parts are not shown in detail.

The rear bar may have, as at 49, near each shackle 48, a reverse bend which offsets the middle part 47 rearward and serves to limit any sliding movement in that direction of the shackles 48, and their associated bumper parts, preventing undue flattening of the impact bars 42 under compression.

It is desirable at times to combine bars differing somewhat in height, as shown in Figs. 12 to 14, the auxiliary bars 42 being narrower vertically than the main bar 41, and such a combination of bars is facilitated by the use of the form of shackle illustrated, as the part 20 thereof serves to space the impact bars at the desired vertical distance apart, regardless of their height, which may be varied as required by providing bolts 14 of proper length.

Claims—

1. An automobile bumper comprising as elements a plurality of impact bars superimposed in vertical relation and having eyes; a rear bar also having an eye; a shackle device having an apertured portion arranged between adjacent eyes on certain of said impact bars and having other apertured portions embracing said eye on the rear bar; and connecting bolts transfixing said eyes and shackle apertures respectively.

2. An automobile bumper comprising as elements a plurality of impact bars superimposed in vertical relation and having their respective ends bent to form loops with terminal eyes; a rear bar also having terminal eyes; shackle devices having apertured portions arranged between said eyes on said impact bars and having other apertured portions embracing said eyes on the rear bar; and connecting bolts transfixing said eyes and shackle apertures respectively.

3. An automobile bumper comprising as elements a plurality of impact bars superimposed in vertical relation and having their respective ends bent to form loops with terminal eyes; a rear bar also having a terminal eye; a shackle device having an apertured portion arranged between adjacent eyes on certain of said impact bars and having other apertured portions embracing said eye on the rear bar; and connecting bolts transfixing said eyes and shackle apertures respectively.

4. An automobile bumper comprising as elements a plurality of impact bars superimposed in vertical relation and having eyes; a rear bar also having an eye; shackle means having an apertured portion arranged between said eyes on said impact bars and having other apertured portions embracing said eye on the rear bar; and connecting bolts transfixing said eyes and shackle apertures respectively, said impact elements being adapted for assembly with said rear bar and shackle means in quantities of two or more interchangeably.

5. An automobile bumper comprising as elements a plurality of impact bars superimposed in vertical relation and each having an eye; a rear bar also having eyes; shackle means having apertured portions arranged betweeen said eyes on said impact bars and having other apertured portions embracing said eyes on the rear bar; and connecting bolts transfixing said eyes and shackle apertures respectively, said impact elements being adapted for assembly with said rear bar and shackle means in quantities of two or more interchangeably.

6. An automobile bumper of the fender guard type comprising as elements a plurality of impact bars superimposed in vertical relation and having eyes; a rear bar also having an eye; a shackle device having an apertured portion arranged between said eyes on said impact members and having other apertured portions embracing said rear bar; and connecting bolts transfixing said eyes and shackle apertures respectively.

7. An automobile bumper of the fender guard type comprising as elements a plurality of impact bars superimposed in vertical relation and having terminal eyes; a rear bar also having a terminal eye; a shackle member having an apertured portion arranged between said eyes on said impact members and having other apertured portions embracing said rear bar; and connecting bolts transfixing said eyes and shackle apertures respectively.

8. An automobile bumper of the fender guard type comprising as elements a plurality of impact bars superimposed in vertical relation and each bent to form a loop with a terminal eye at the outer end and inner end respectively; a rear bar also having a terminal eye at its outer end; shackle means having an apertured portion arranged between said eyes on the outer ends of said impact members and having other apertured portions embracing the eye on said rear bar; and connecting bolts transfixing said eyes and shackle apertures respectively, forming a hinged connection between the outer eyes of said impact bars and rear bar.

9. An automobile bumper of the fender guard type comprising as elements a plurality of impact bars superimposed in vertical relation and each bent to form a loop with a terminal eye at the outer end and inner end respectively; a rear bar also having a terminal eye at its outer end; shackle means having an apertured portion arranged between said eyes on the outer ends of said impact members and having other apertured portions embracing the eye on said rear bar; and connecting bolts transfixing said eyes and shackle apertures respectively, forming a hinged connection between the outer eyes of said impact bars and rear bar; and a bolt connecting the inner eyes of said impact members in pivoted relation with said rear bar.

10. An automobile bumper of the fender guard type comprising as elements a plurality of impact bars superimposed in vertical relation and each bent to form a loop with a terminal eye at the outer end and inner end respectively; a rear bar also having a terminal eye at its outer end; a shackle device having an apertured portion arranged between said eyes on the outer ends of said impact members and having other apertured portions embracing the terminal eye on said rear bar; and connecting bolts transfixing said eyes and shackle apertures respectively, forming a hinged connection between the outer eyes of said impact bars and rear bar, a bolt connecting the inner eyes of said impact members in pivoted relation with said bar, and a shackle device arranged to embrace said rear bar loosely and transfixed by said last mentioned bolt.

11. An automobile bumper of the fender guard type comprising as elements a plurality of impact bars superimposed in vertical relation and each bent to form a loop with a terminal eye at the outer end and inner end respectively; a rear bar also having a terminal eye at its outer end; shackle members having apertured portions arranged between said eyes on the outer ends of said impact members and having other apertured portions embracing the eye on said rear bar; and connecting bolts transfixing said eyes and shackle apertures respectively, forming a hinged connection between the outer eyes of said impact bars and rear bar and a bolt connecting the inner eyes of said impact members in pivoted relation with said rear bar, said bolt co-operating with a pair of shackle members arranged to embrace said rear bar.

12. An automobile bumper of the fender guard type comprising as elements a plurality of impact bars superimposed in vertical relation and having terminal eyes; a rear bar also having terminal eyes; shackle members each having an apertured portion arranged between said eyes on said impact bars and having other apertured portions embracing said rear bar; and connecting bolts transfixing said eyes and shackle apertures respectively, said impact bars being adapted for assembly with said rear bar and shackle means in quantities of two or more interchangeably.

13. An automobile bumper comprising an impact bar having an end loop with a terminal eye; a support for said impact member comprising a rear bar adapted to be attached to an automobile and also having a terminal eye; and a shackle device having apertured portions registering with said eyes on said bars respectively; and connecting bolts transfixing said eyes and shackle apertures respectively, the connection between said shackle device and rear bar occupying a position between the body of said impact bar and its loop-end connection with said shackle device.

14. A shackle member for multi-bar automobile bumpers of the type having impact bars with eyes, said shackle member comprising an apertured portion adapted to enter between the eyes of two of said impact bars, spacing the same in vertical relation, and to receive a bolt transfixing said eyes and aperture for connection pivotally of said impact bars with said shackle member, said shackle member having also an offset apertured portion to receive a bolt for connection of said shackle member with another bumper bar having an eye through which said bolt extends.

15. A shackle member for multi-bar automobile bumpers of the type having impact bars with eyes, said shackle member comprising an apertured portion adapted to enter between the eyes of two of said impact bars, spacing the same in vertical relation, and to receive a bolt transfixing said eyes and aperture for connection pivotally of said impact bars with said shackle member, said shackle member having also an offset apertured portion provided with an apertured boss to receive a bolt for connection of said shackle member with another bumper bar having an eye through which said bolt extends.

16. A shackle member for multi-bar automobile bumpers of the type having impact bars with eyes, said shackle member comprising an apertured portion adapted to enter between the eyes of two of said impact bars, spacing the same in vertical relation, and to receive a bolt transfixing said eyes and aperture for connection pivotally of said impact bars with said shackle member, said shackle member having also a plurality of offset portions spaced apart to embrace the eye of another bumper bar and apertured to receive a connecting bolt transfixing said offset portions and eye respectively for connection of said shackle pivotally with said other bumper bar.

17. A shackle member of the class described comprising a body portion having an apertured portion offset therefrom medially and having a plurality of apertured portions spaced apart and offset therefrom oppositely from said medial offset portion, said medial offset portion being adapted to enter between a plurality of impact bars having eyes transfixed by a connecting bolt passing also through said medial apertured portion of said shackle, and the opposite offset portions of said shackle being adapted to embrace the eye of another bumper bar transfixed by a bolt passing through said eye and said apertured offset portions, whereby said bumper bars are hinged to each other through the medium of said shackle members.

In testimony whereof, I have signed this specification.

FRED HOWE.